United States Patent
Grossman et al.

(10) Patent No.: US 11,605,061 B2
(45) Date of Patent: Mar. 14, 2023

(54) SYSTEM AND METHOD FOR ACTIVATING A BEACON-BASED SERVICE LOCATION APPLICATION

(71) Applicant: Capital One Services, LLC, McLean, VA (US)

(72) Inventors: Andrew Grossman, McLean, VA (US); Rachel Collins, Brooklyn, NY (US); Edward Abbott, Wilmington, DE (US); Jeremy Phillips, Brooklyn, NY (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 84 days.

(21) Appl. No.: 17/350,645

(22) Filed: Jun. 17, 2021

(65) Prior Publication Data
US 2022/0405725 A1    Dec. 22, 2022

(51) Int. Cl.
G06Q 20/10    (2012.01)
H04W 4/029    (2018.01)

(52) U.S. Cl.
CPC .......... *G06Q 20/108* (2013.01); *H04W 4/029* (2018.02)

(58) Field of Classification Search
CPC .............................. G06Q 20/108; H04W 4/029
See application file for complete search history.

(56) References Cited

U.S. PATENT DOCUMENTS

| | | | |
|---|---|---|---|
| 2015/0140982 A1* | 5/2015 | Postrel | H04L 67/52 455/418 |
| 2015/0215737 A1 | 7/2015 | Shin et al. | |
| 2016/0321702 A1* | 11/2016 | Lerman | G06Q 30/0261 |

FOREIGN PATENT DOCUMENTS

EP    2319226 A2 *    5/2011    ............. G06Q 30/02

OTHER PUBLICATIONS

Dhanyatha et al.: A Survey on System using Beacon Technology, Apr. 2019, International Research Journal on Engineering and Technology, vol. 6, Issue 4, pp. 4048-4052. (Year: 2019).*
Kim, Moses: Setting Up Beacons in Android: No Beacon Manager App Required, Apr. 20, 2017, pp. 1-18. (Year: 2017).*
Martin, Chuck: How Beacons Are Changing the Shopping Experience, Sep. 1, 2014, Harvard Business Review, pp. 1-6. (Year: 2014).*

* cited by examiner

*Primary Examiner* — Bijendra K Shrestha
(74) *Attorney, Agent, or Firm* — Hunton Andrews Kurth LLP

(57) ABSTRACT

An automated method is provided for enabling and implementing a beacon-based service location application in a user device having a beacon monitoring application. A service location facilitation server establishes service need criteria for a user of the user device and estimates a service need state for the user. The service need state includes information indicative of a relative need for a desired service. The service location facilitation server then determines whether the service need state meets the service need criteria, and, if so, transmits an instruction to the user device to transition the beacon monitoring application from an inactive state to an active monitoring state.

19 Claims, 8 Drawing Sheets

SYSTEM AND METHOD FOR ACTIVATING A BEACON-BASED SERVICE LOCATION APPLICATION

FIELD OF THE INVENTION

This application relates generally to wireless beacon locating systems, and in particular, to a system and method for activating a beacon monitoring application in a mobile device based on a determination of need for a service at a beacon-equipped service location.

BACKGROUND OF THE INVENTION

In recent years, there has been a proliferation of privately-owned, automated service machines. Such machines are often located within unrelated retail businesses or large public places such as malls or airport terminals. While these machines provide a degree of convenience, many potential users may be unaware of their presence. There also may be instances where a user is aware of or is alerted to the presence of an automated service kiosk, but does not have a current need for the service. There is accordingly a need to anticipate and match the need for a service by a potential user with a convenience automated service machine capable of providing that service.

SUMMARY OF THE INVENTION

An illustrative aspect of the invention provides an automated method of enabling and implementing a beacon-based service location application in a user device having a beacon monitoring application. The method comprises establishing, by a service location facilitation server, service need criteria for a user of the user device. The service location facilitation server estimates a service need state for the user, where the service need state comprises information indicative of a relative need for a desired service. The method further comprises determining, by the service location facilitation server, whether the service need state meets the service need criteria, and, responsive to a determination that the service need state meets the service need criteria, transmitting, by the service location facilitation server, an instruction to the user device to transition the beacon monitoring application from an inactive state to an active monitoring state. The automated method according may further comprise receiving, by the service location facilitation server from the user device, a beacon notification message including beacon identification information associated with a beacon transmission received by the user device from a transmitting beacon. The automated method may also comprise determining, by the service location facilitation server, whether the transmitting beacon is associated with a service location that meets needed service criteria, and responsive only to a determination that the transmitting beacon is associated with a service location that meets the needed service criteria, transmitting a push notification to the user device. The push notification includes identification of the desired service and the service location.

Another aspect of the invention provides an automated processing system for enabling and implementing a beacon-based service location application in a user device having a beacon monitoring application. The system comprises a service need processor and a beacon evaluation processor. The service need processor has a first communication interface for communication via a network and is configured to receive service need information for an account holder from at least one of the set consisting of a user device of the account holder and an account servicing processor administering an account of the account holder. The service need information comprises information indicative of a relative need for a desired service. The service need processor is further configured to establish service need criteria for the account holder, where the service need criteria is usable to determine whether the account holder is likely to have a need for the desired service. The service need processor is also configured to estimate a service need state for the account holder using the service need information and determine whether the service need state meets the service need criteria. If the service need state meets the service need criteria, the service need processor transmits an instruction to the user device to transition the beacon monitoring application from an inactive state to an active monitoring state. The beacon evaluation processor has a second communication interface for communication via the network and is configured to receive, from the user device via the network, a beacon notification message including beacon identification information associated with a beacon transmission received by the user device from a transmitting beacon. The beacon evaluation processor is further configured to determine whether the transmitting beacon is associated with an authorized service location and, if the transmitting beacon is associated with an authorized service location, determine whether the authorized service location is capable of providing the desired service. If the service location is capable of providing the desired service, the beacon evaluation processor transmits a push notification to the user device via the network. The push notification includes identification of the desired service and the authorized service location.

Another aspect of the invention provides a beacon-based system for alerting a user to availability of a desired service. The system comprises a plurality of service locations, a user device, and a service location facilitation server. Each service location has an automated service system configured for providing a user service, where the automated service system is in communication with a service provider server via a network. Each service location also has a beacon configured for transmitting a beacon signal comprising a unique beacon identifier associated with the service location. The user device comprises a data processor, a user device communication interface configured for selective communication with the network, a beacon signal receiver, and a memory accessible by the data processor. The memory has stored thereon a beacon monitoring application having an active monitoring state and an inactive state. The application is configured for, when in the active monitoring state, instructing the data processor to receive beacon signals from the beacons via the beacon signal receiver, and for each signal, determine the unique beacon identifier for each signal and transmit, via the network, a beacon notification message comprising the unique beacon identifier. The service location facilitation server comprises a service need processor having a first communication interface for communication via the network. The service need processor is configured to estimate a service need state for a user of the user device, where the service need state comprises information indicative of a relative need for a desired service. The service need processor is further configured to determine whether the service need state meets service need criteria. Responsive to a determination that the service need state meets service need criteria, the service need processor transmits an instruction to the user device to transition the beacon monitoring application from the inactive state to the active monitoring state. The service location facilitation server further comprises a beacon evaluation processor having a second communication interface for communication via the network. The beacon evaluation processor is configured to receive, from the user device via the network, the beacon notification message and determine whether the beacon identified by the unique beacon identifier in the beacon notification message is associated with an authorized service location that meets needed service criteria. Responsive only to a determination that the beacon identified by the unique beacon identifier is associated with an authorized service location that meets the needed service criteria, the beacon evaluation processor transmits a push notification to the user device. The push notification includes identification of the desired service and the authorized service location.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE INVENTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method actions does not preclude the presence of additional method actions or intervening method actions between those actions expressly identified. Similarly, it is also to be understood that the mention of one or more components in a device or system does not preclude the presence of additional components or intervening components between those components expressly identified.

The present invention provides systems and methods for estimating a user's need for an automated service and, upon identifying a likely need for the service, using a beacon-based communication system to alert the user to the availability of an automated service machine capable of providing the service. The invention makes use of a network of ASMs that provide convenient customer access to any of various automated services. As used herein, the term "automated service machine" or "ASM" means a network-enabled machine that can verify user authorization, communicate with a central account transaction processing system, and provide an automated service to the user. The invention is usable for any automated service, but may be particular useful in relation to cash-related services. In certain embodiments of the invention, an ASM may be a machine configured for carrying out a cash-related service. This could be, for example, an automated teller machine (ATM) or a machine configured for receiving coins and returning paper money. In some embodiments, an ASM may be an automated product or service vending machine that is configured for accepting and dispensing cash in addition to its ordinary dispensing function. In other embodiments, ASMs may provide non-cash-related services such as key cutting or document copying.

Figure 1:
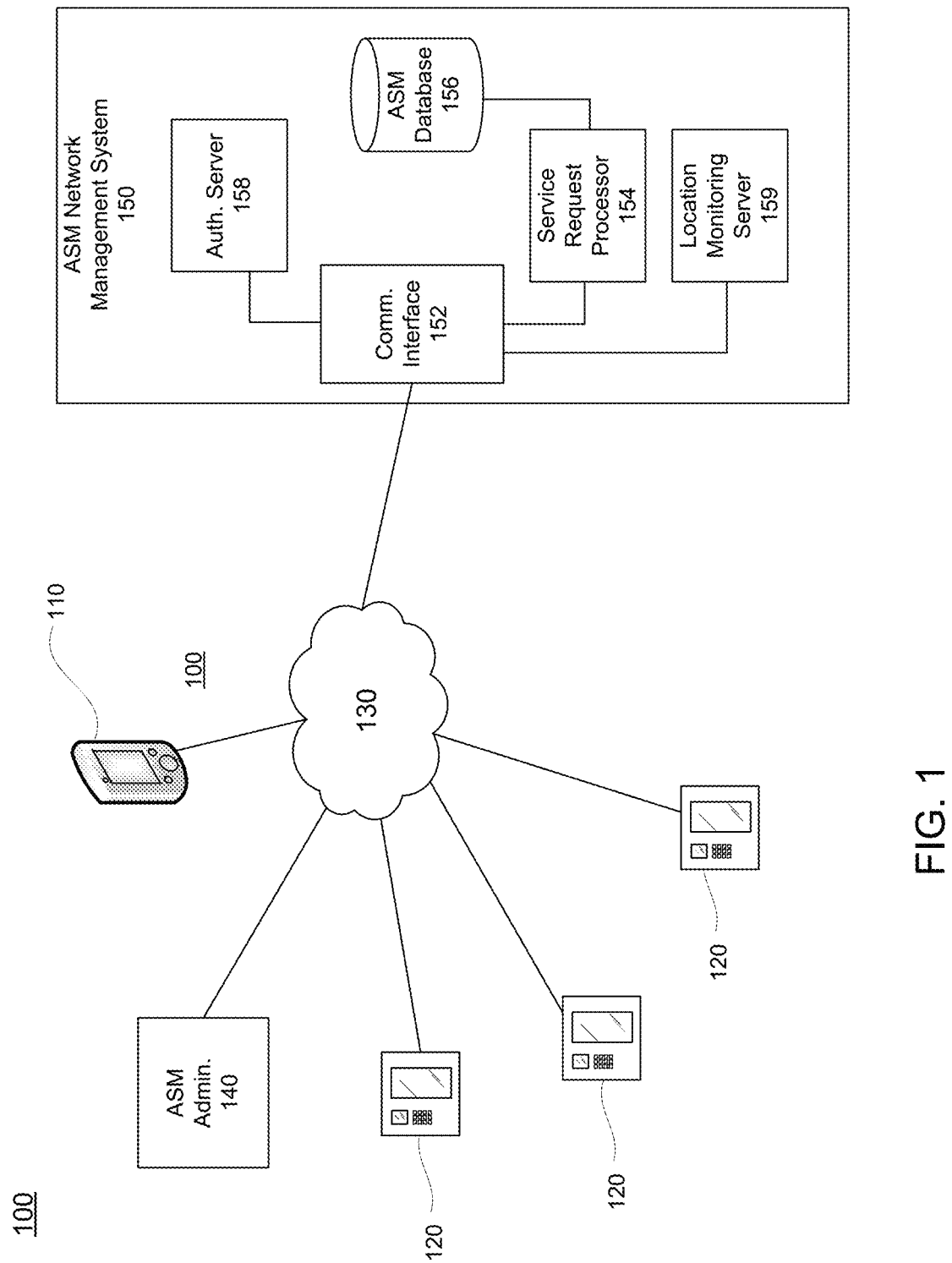
FIG. 1 is a schematic representation of an ASM monitoring system usable in conjunction with exemplary methods disclosed herein.

Methods of the invention can be implemented on or in conjunction with a service transaction processing system that incorporates and manages a network of automated service machines. FIG. 1 depicts a system 100 for processing a service transactions at a networked ASM according to an embodiment of the invention. Various elements of the system 100 may be or include network-enabled computer systems, including, as depicted in FIG. 1, an account holder user device 110, each of a plurality of automated service machines 120, an ASM administrator 140, and an ASM network management system 150. Any or all of these system elements may be capable of communication with one another via a communication network 130. In some embodiments, certain components of the system 100 may communicate with one another via a second network in addition to or instead of the network 130.

As referred to herein, a network-enabled processor, computer system or device may include, but is not limited to any computer device, or communications device including, a server, a network appliance, a personal computer (PC), a workstation, and a mobile processing device such as a smart phone, smart pad, handheld PC, or personal digital assistant (PDA). Mobile processing devices may include Near Field Communication (NFC) capabilities, which may allow for communication with other devices by touching them together or bringing them into close proximity.

Figure 3:
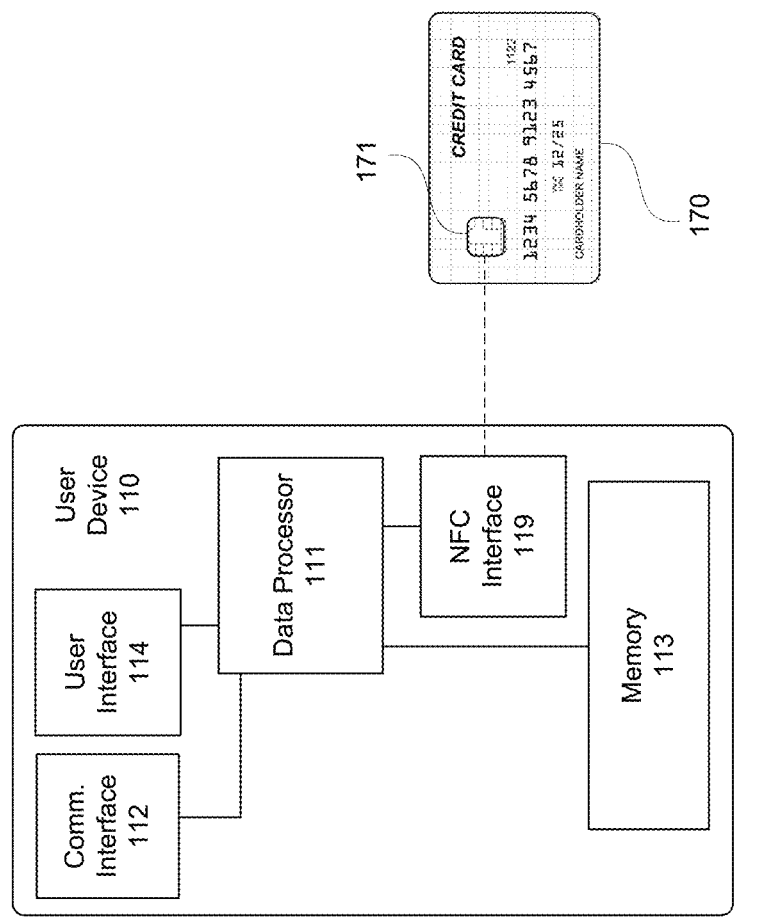
FIG. 3 illustrates a user device and transaction card usable in conjunction with exemplary methods disclosed herein.

The network-enabled computer systems used to carry out the methods contemplated by the invention may execute one or more software applications to, for example, receive data as input from an entity accessing the network-enabled computer system, process received data, transmit data over a network, and receive data over a network. The one or more network-enabled computer systems may also include one or more software applications to send notifications to an account holder or other user. In some examples, computer systems and devices may use instructions stored on a computer-accessible medium (e.g., a storage device such as a hard disk, floppy disk, memory stick, CD-ROM, RAM, ROM, etc., or a collection thereof). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein. It will be understood that the depiction in FIG. 3 is an example only, and the functions and processes described herein may be performed by any number of network-enabled computers. It will also be understood that where the illustrated system 100 may have only a single instance of certain components, multiple instances of these components may be used. The system 100 may also include other devices not depicted in FIG. 1.

The network 130 may be any form of communication network capable of enabling communication between the transaction entities and the transaction monitoring system 100. For example, the network 130 may be one or more of a wireless network, a wired network or any combination of wireless network and wired network. The network 130 may be or include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g or any other wired or wireless network for transmitting and receiving a data signal. The network 130 may utilize one or more protocols of one or more network elements to which it is communicatively coupled. The network 130 may translate to or from other protocols to one or more protocols of network devices. Although the network 130 is depicted as a single network, it will be appreciated that it may comprise a plurality of interconnected networks, such as, for example, the Internet, a service provider's network, a cable television network, corporate networks, and home networks.

The ASM network management system 150 is a network-enabled processing system configured for communication with one or more account holder user devices 110 and each of the plurality of automated service machines 120 via the network 130. The management system 150 includes a secure communication interface 152 in communication with the network 130 and configured to receive communications from the user devices 110 and the ASMs 120 and to provide an initial security screen to validate such communications. The management system 150 further includes a service request processor 154 that is configured for receiving ASM service requests from account holder-associated user devices 110. A service request may be received as a separate, standalone request (e.g., an email request) or may be made as part of an on-line interactive session between the user device 110 and the ASM network management system 150. In particular embodiments, the request may be transmitted by the user device 110 using an application resident on the user device 110.

An ASM service request may include identification information usable by the request processor 154 to identify the user device and/or the account with which the user device is associated. The request may further include information about a service the account holder wishes to obtain using an ASM 120. This may include information indicating the type of service and characteristics of the transaction. In some embodiments, it may also include current user device location information and/or information relating to a desired ASM location or area. The request processor 154 may be configured to conduct an initial authorization verification to assure that the user device 110 and/or the user are authorized to request and carry out the requested transaction.

The service request processor 154 is configured to process a service request by retrieving ASM information from an ASM database 156 and comparing it to selection criteria established for the requested service type. Based on this comparison, the request processor 154 may construct an initial candidate list of ASMs 120. Initial selection criteria may be used to rule out ASMs 120 that are not capable of carrying out the requested service and/or ASMs 120 not meeting location limitations. The ASM database 156 includes an ASM data record for each ASM 120 in the ASM network. The data record may include such information as a machine identifier, location of the ASM 120, merchant outlet association, accessibility limitations, transaction capabilities or limitations, and administrator information. In some cases, some or all of the candidate ASMs 120 may be managed by a separate third party ASM administrator 140. In such cases, information for an ASM 120 so-managed may be obtained by the management system 150 from the ASM administrator 140 and stored in the database 156 at the time the ASM 120 is added to the system 100.

It will be understood that in embodiments where the ASMs 120 are managed by an ASM administrator 140, the management system 150 may not be in direct communication with the ASMs 120. In such cases, the management system 150 may be limited to communication with the administrator 140.

In determining whether location criteria are met, the service request processor 154 may require location information for the user device 110 at the time of the request. Such information may be provided by the location monitoring server 159 based on location service information received from the user device 110.

The service request processor 154 may be configured to further reduce the set of ASM candidates for a particular service transaction based on the current or future availability of each candidate. This may include transmitting to each candidate ASM 120 or to the ASM administrator 140 a status request and receiving status information in response. Such status response information is then used by the processor 154 to determine which candidate ASMs 120 are available to conduct the requested transaction.

The service request processor 154 may be configured to determine a best candidate ASM 120 based on the initial selection criteria and/or candidate availability information. Information on the candidate ASM 120 may then be sent to the user device 100. Alternatively, the service request processor 154 may be configured to determine a final set of ASM candidates based on the initial selection criteria and/or candidate availability information. The processor 154 may then transmit the set of ASM candidates to the user device 110 for display to the account holder. In some embodiments, processor 154 may be configured to receive a response from the user device 110 that includes a selection of a particular ASM 120. In such embodiments, the request processor may transmit a notification to the transaction ASM 120 and/or the ASM administrator 140 for that ASM 120.

The authentication server 158 is a network-enabled processing system that may be configured to assure the presence of an authorized user device 110 or an authorized account-holder transaction card at the ASM location when the requested automated service transaction is processed. The authentication server 158 is further configured to receive a service processing request from either the ASM 120 or the user device 110. The request may include security information such as an account-related password or encrypted information from the user device 110. The authentication server 158 may be configured to verify association of the user device 110 (or a presented transaction card) with the account, identify the requested service, and/or to transmit an authentication code for the transaction to the user device 110. The authentication server 158 may also be configured to, upon verification of authorization of the user device or transaction card, transmit instructions to the ASM 120 (or ASM administrator 140) to initiate delivery of the requested automated service.

The location monitoring server 159 is a network-enabled server or other processing system in communication with the network 130 via the communication interface 152 and is generally configured to determine or estimate the location of the account holder. In some embodiments, the location monitoring server 159 is configured to continuously or periodically receive location information from a mobile user device 110 that is associated with the account and has a location service application and to make this location information available to the service request processor 154 and the authentication server 158. The location monitoring server 159 may, in addition or instead, be configured to transmit a request to the user device 110 to activate the location service if it determines that the service is not active. Such a request may be transmitted upon receipt of a service request, upon receipt of a transaction processing request, or at a particular time prior to a requested transaction window. If the location service is not activated or no service is available, the location monitoring server 159 may transmit a request to the user for current location information.

Figure 2:
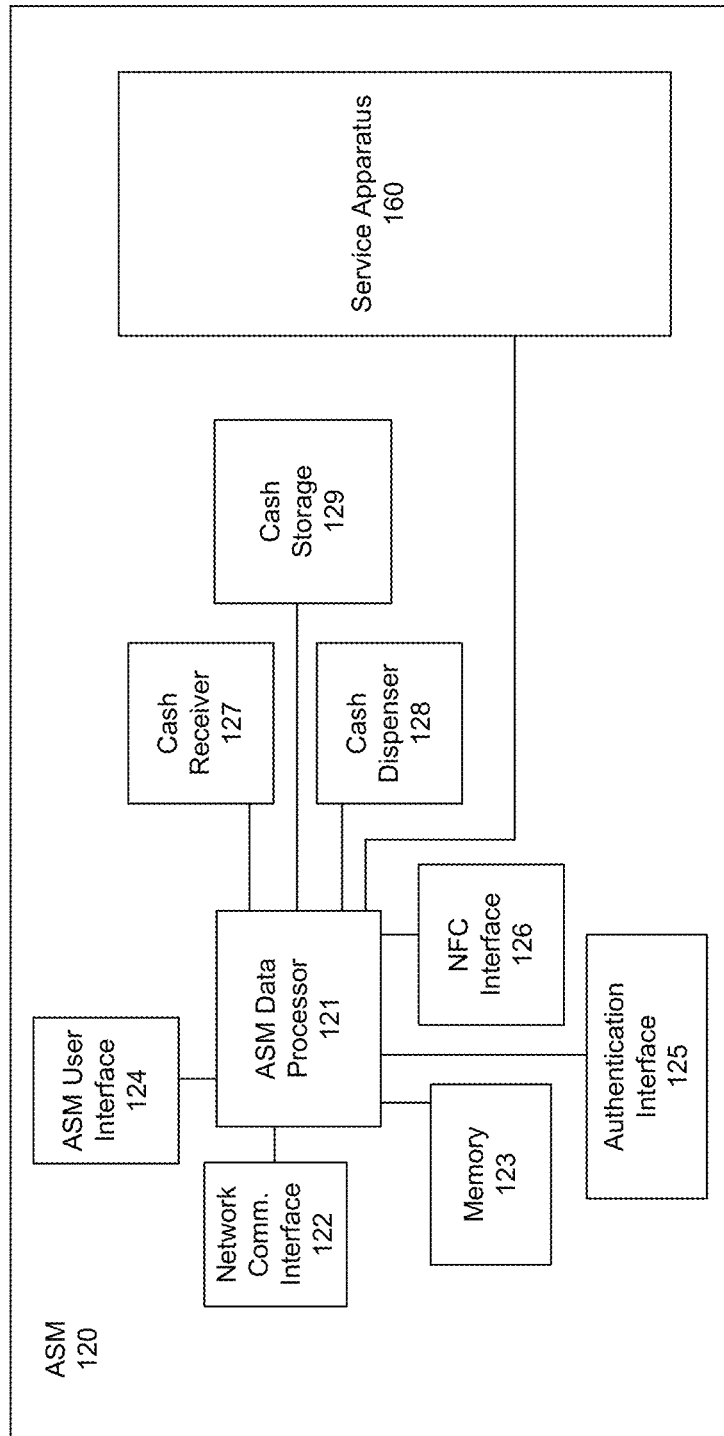
FIG. 2 is a schematic representation of an automatic service machine usable in conjunction with embodiments of the invention.

FIG. 2 is a schematic representation of an exemplary ASM 120. The exemplary ASM 120 includes an ASM data processor 121 and a user interface 124 that is configured for receiving information from and displaying information to an ASM user. The user interface 124 may include any device for entering information and instructions into the ASM, such as a touch-screen, keyboard, cursor-control device, microphone, stylus, or digital camera. The user interface 124 may also include a display, which can be any type of device for presenting visual information such as a computer monitor, a flat panel display, and a mobile device screen, including liquid crystal displays, light-emitting diode displays, plasma panels, and cathode ray tube displays. The display may, in particular, be configured for displaying an ASM transaction authentication code. In some embodiments, the ASM 120 may also have an authentication interface 125 configured for capturing a digital image of a purported authentication code. The authentication interface 125 may be any digital image capturing device such as a digital camera or scanner positioned to allow a user to present for capture an image displayed on a user device 110.

The exemplary ASM 120 includes either or both of a cash receiver arrangement 127 and a cash dispenser 128. The cash receiver arrangement 127 may be any mechanism configured for securely receiving cash from a user, determining an amount of cash received, and depositing the cash into a secure cash storage arrangement 129. In some embodiments, the cash receiver arrangement may also be configured for receiving and scanning checks or other documents required for processing an ASM transaction. The cash dispenser 128 may be any mechanism configured for drawing a specified amount of cash from a cash storage arrangement 129 and dispensing it to an authorized ASM user.

In some embodiments, the ASM 120 may include a service apparatus 160 in communication with the ASM data processor 121. The service apparatus 160 may be or comprise any machine for providing an automated service. This could include, for example, the conventional machinery for an automatic car wash or a machine for exchanging coins for paper currency. The operation of the service apparatus 160 may be controlled by the ASM data processor 121 and may make use of the cash receiver 127 and cash dispenser 128 for product or service purchase transactions. In some embodiments, the service to be provided is, itself, reception of cash for deposit into a user's account, which may not require additional service apparatus 160.

The ASM 120 includes an ASM data processor 121 configured to communicate over the network 130 via a network communication interface 122. The ASM data processor 121 is in communication with a memory 123, which has stored therein information associated with the operation of the ASM 120. This may include identification information (e.g., an ASM identifier) and/or location information. The memory 123 may also have applications installed therein with instructions for carrying out vending and reporting operations. This may include, for example, an application configured for processing machine services or product purchases and providing instructions to the service apparatus 160. It may also include transmitting purchase and other transaction information to an ASM administrator 140.

The memory 123 may also have a service transaction application stored therein. The service transaction application may include instructions for establishing communication with a user device 110 and/or a smart transaction card 270 of an account holder. In some embodiments, the application may be configured to accomplish this through the use of an NFC interface 126, which may be configured to communicate with either or both of the user device 110 and a chip-mounted NFC device 171 of the transaction card 270. The service transaction application may be further configured for authenticating an ASM service requested by an account holder. This may include configuration for receiving multi-factor authentication information from the user device 110 and/or directly from a user via the user interface 124. In some embodiments, authentication may include receiving an ASM transaction authentication code from the authentication server 158 and presenting that code to the requesting account holder using a display of the user interface 124. The code could then be transmitted by the user device 110 to the authentication server 158 for authentication. Alternatively, the authentication instructions may include instructions to capture a digital image of a purported authentication code using the authentication interface 125 and transmitting the purported authentication code to the authentication server 158 for authentication. Regardless of the specific method, the service transaction application may be further configured to, upon authentication, receive instructions from the authentication server 125 to carry out the requested service upon authentication by the server 125. The service transaction application may be further configured to transmit transaction completion information to the ASM network management system 150 and/or the ASM administrator 140.

It will be understood that the various ASMs 120 of the system 100 may have different service capabilities and/or capacities. While all may have the same network and local communication capabilities, the services they provide may be substantially different. For example, some of the ASMs 120 may be able to receive coins while others are not. Some may be configured for providing a mechanical service (e.g., a car wash) while others are configured only for providing financial services.

With reference to FIG. 3, an account holder (or other user) processing device 110 may be any data processing and/or communication device that an account holder uses to carry out a transaction and/or to communicate with an application processing authority or the ASM network management system 150 including, but not limited to a smartphone, a laptop, a desktop computer, and a tablet. In particular embodiments, the account holder device 110 includes an on-board data processor 111 in communication with a memory module 113, a user interface 114, and a communication interface 112. The device 110 may also include an image capturing device (e.g., a digital camera or scanner). The data processor 111 can include a microprocessor and associated processing circuitry, and can contain additional components, including processors, memories, error and parity/CRC checkers, data encoders, anticollision algorithms, controllers, command decoders, security primitives and tamper-proofing hardware, as necessary to perform the functions described herein. The memory 113 can be a read-only memory, write-once read-multiple memory or read/write memory, e.g., RAM, ROM and EEPROM, and the user device 110 can include one or more of these memories.

The user interface 114 includes a user input device or mechanism, which can be any device for entering information and instructions into the account holder device 110, such as a touch-screen, keyboard, mouse, cursor-control device, microphone, stylus, or digital camera. The user interface 114 may also include a display, which can be any type of device for presenting visual information such as a computer monitor, a flat panel display, and a mobile device screen, including liquid crystal displays, light-emitting diode displays, plasma panels, and cathode ray tube displays.

The communication interface 112 is configured to establish and support wired or wireless data communication capability for connecting the device 110 to the network 130 or other communication network. The user device 110 may also include an NFC interface 119 that can be configured to support near field communication with an NFC transmitter/receiver. The NFC interface 112 may, in particular, be configured for near field communication with a chip-mounted NFC device 171 of a smart transaction card 170 associated with a transaction account.

In embodiments of the invention, the memory 113 may have stored therein one or more applications usable by the data processor 111 to conduct and/or monitor transactions between the account holder device 110 and a merchant device or transaction processing system over the network 130. These applications may include instructions usable by the data processor 111 to identify transaction events, store event data in the memory 113, and communicate event data to a service request processor.

In certain embodiments, the memory 113 may have stored therein an ASM transaction application associated with a user account for facilitating the use of the transaction processing system 100. This application may include instructions to receive information from the user via the user interface 114 regarding a service the account holder wishes to receive from an ASM 120. The application further include instructions to use the user-supplied information to construct and transmit an ASM service request to the service request processor 154 of the ASM network management system 150. The user information may identify the desired service and specific characteristics thereof. The information may also include a desired ASM location or a desired area within which the transaction ASM 120 should be located. It may also include any limitations on the service or the ASM 120 to be used. In some embodiments, the user information may include a current location of the account holder or user device. The service request may include the user-supplied information, information identifying the user device, the account holder, and/or the account. The application may be further configured to instruct the data processor 111 to communicate with the ASM network management system 150 to provide additional information as necessary. This may be accomplished through an interactive session with the ASM network management system 150 in which transaction and/or ASM location options may be received from the service request processor 154 and presented to the user via the user interface 114. The application may include instructions to transmit to the service request processor 154 a selected transaction ASM.

The transaction application may also include instructions configured for establishing communication with the authentication server 158 to facilitate authentication of the user device 110 and/or the account holder upon establishing interaction with the transaction ASM 120.

In some embodiments of the invention, the transaction application may be configured for automatically establishing wireless communication with the transaction ASM 120 when the user device 110 is brought to within a minimum distance of the transaction ASM 120. This communication may be established for example, using the NFC interface 116. The application may be configured to receive ASM identification information via such communication and to include this information in the transaction processing request. Alternatively, or in addition, the application may be configured to communicate user device or account information to the transaction ASM 120, which may then use that information in a transaction processing request.

The memory 113 may also have stored therein a location service application having instructions for the data processor 111 to generate device location information that can be used to determine the location of the user device 110. The application may further include instructions to transmit the location information to the location monitoring server 159 via the communication interface 112 and the network 130.

The above-described system 100 can be used to assist a user in finding an available ASM 120. In a typical scenario, the user employs the ASM transaction application of the user device 110 to send a request for a particular service. The service request processor 154 of the ASM network management system 150 receives the request and uses information from the user to identify candidate ASMs 120. This may include ascertaining the user's location from user-provided or user device-provided information. Using predetermined criteria, the request processor 154 assembles a listing of one or more suggested ASMs 120 and sends it to the user device for display to the user. The user can then proceed to one of the suggested ASMs 120 and initiate a service transaction.

It can be seen that the above scenario depends on the user to initiate the sequence with a service request. It also depends on the estimation of user location based user or user device-provided information.

Embodiments of the present invention improve upon the automated service request methodology through the implementation of wireless beacon technology. Wireless beacons are devices that generate and transmit wireless signals over greater distances than near field communication (NFC) systems but still within a relatively small area of coverage. Typical beacon systems using low energy Bluetooth® transmission transmit signals for reception within a 50-150 foot radius. For pinpoint location, the technology is far superior to GPS systems, particular for indoor areas. Their superiority has led to wide use of wireless beacons for triggering the communication of advertisements and other information to shoppers within a retail store environment.

The present invention provides a plurality of automated service locations, each having an ASM and a beacon broadcasting a unique beacon identifier. This allows the association of the beacon identifier with the ASM so that a central location service provider can use the beacon as a mechanism for determining that the user device of an account holder is nearby a service location that can fulfil a need of the account holder. This may be accomplished by having the user device listen for beacon signals and transmit received beacon identifiers to the central location service, which checks the identifiers to see if they are associated with an appropriate ASM.

While the above approach may provide a significant convenience to the account holder, the wide use of low energy beacons could lead to the user device constantly receiving and transmitting identifiers. For example, a user may enter a shopping center where hundreds of low energy beacons are located. The user device may be inundated with hundreds of beacon signals, few, if any, of which would be associated with a need of the user, but all of which would require identification and transmission by the user device and evaluation by a server of the location service provider.

Accordingly, the present invention provides systems and methods in which the beacon monitoring function is active only upon identification of an actual or probable service need for the account holder/user. This greatly enhances the efficiency of both the user device processor and the server of the location service provider.

Figure 4:
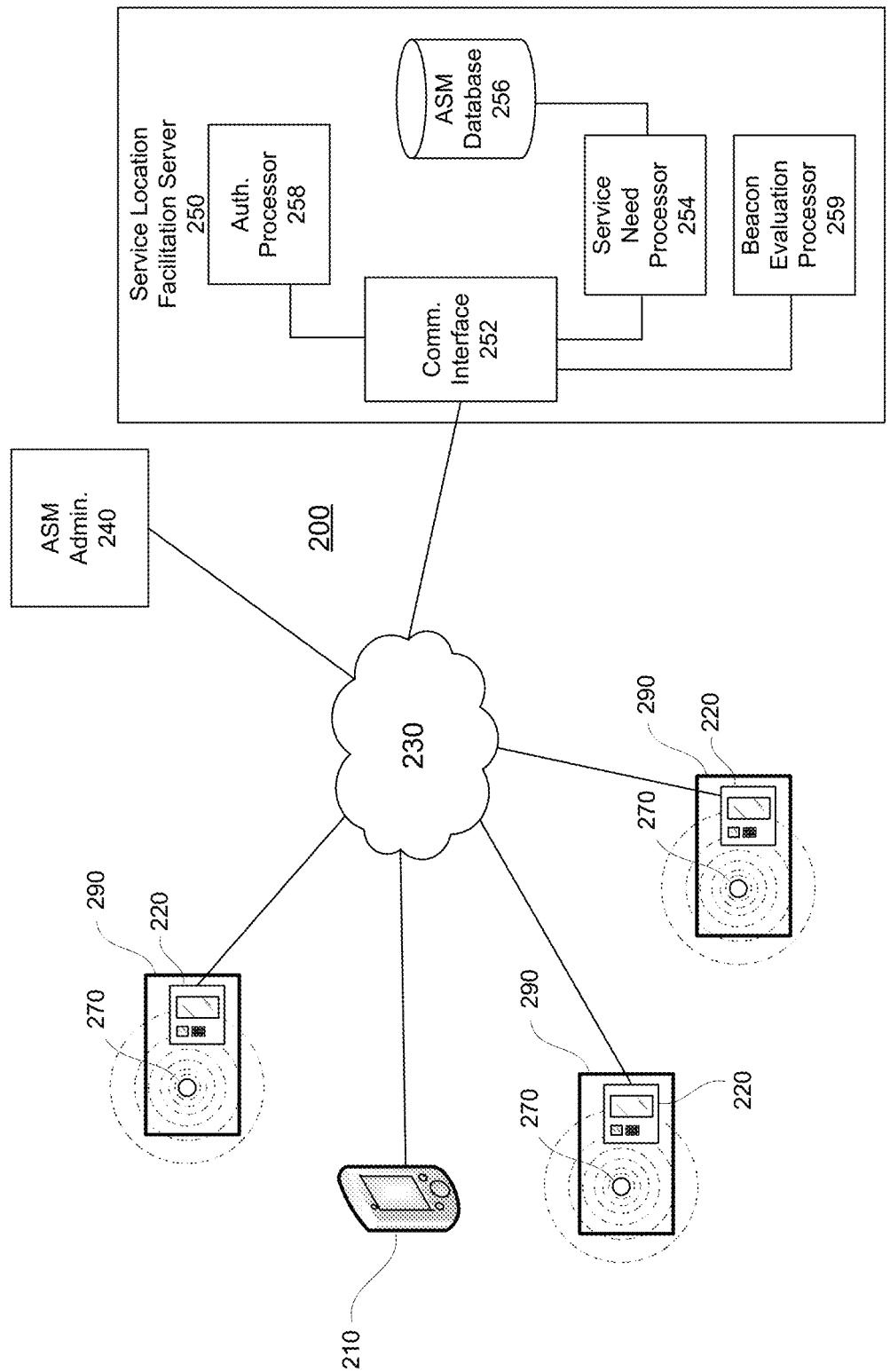
FIG. 4 is a schematic representation of a beacon-based system for alerting a user to availability of a desired service according to an embodiment of the invention.

FIG. 4 schematically illustrates a system 200 for identifying and supplying needed services to an account holder or other user of a mobile device 210 in accordance with an illustrative embodiment of the invention. The system 200 includes a plurality of automated service locations 290, one or more network-enabled user devices 210 (e.g., a mobile phone or other mobile interface device), a service location facilitation server 250, and a communication network 230. The system may also include one or more ASM administrators 240. As in the previously described system 100, any or all of these system elements may be capable of communication with one another via a communication network 130. In some embodiments, certain components of the system 200 may communicate with one another via a second network in addition to or instead of the network 230.

The network-enabled computer systems used to carry out the methods contemplated by the invention may execute one or more software applications to, for example, receive data as input from an entity accessing the network-enabled computer system, process received data, transmit data over a network, and receive data over a network. The one or more network-enabled computer systems may also include one or more software applications to send notifications to an account holder or other user. It will be understood that the depiction in FIG. 4 is an example only, and the functions and processes described herein may be performed by any number of network-enabled computers. It will also be understood that where the illustrated system 200 may have only a single instance of certain components, multiple instances of these components may be used. The system 200 may also include other devices not depicted in FIG. 4.

The network 230 may be any form of communication network capable of enabling communication between the transaction entities and the transaction monitoring system 100. For example, the network 230 may be one or more of a wireless network, a wired network or any combination of wireless network and wired network. The network 230 may be or include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g or any other wired or wireless network for transmitting and receiving a data signal. The network 230 may utilize one or more protocols of one or more network elements to which it is communicatively coupled. The network 230 may translate to or from other protocols to one or more protocols of network devices. Although the network 230 is depicted as a single network, it will be appreciated that it may comprise a plurality of interconnected networks, such as, for example, the Internet, a service provider's network, a cable television network, corporate networks, and home networks.

The service locations 290 of the system 200 are physical locations where a user of the system 200 can obtain automated services. These locations may be physically located anywhere they can be publicly accessed. This may be outdoors or inside a building such as a mall or retail store. Each service location 290 has an ASM 220 and a uniquely identifiable beacon 270. It will be understood that there may be any number of service locations 290 and associated ASMs 220.

Each ASM 220 of the system 200 is configured to provide one or more automated services and may comprise substantially similar elements to those of the ASM 120 of FIG. 2. Each ASM 220 may be in selective communication with an ASM Administrator 240 via the network 230 or another network. It will be understood that the ASMs 220 may be broken into sub-groups managed by different ASM administrators 240. As is in the previously described system 100, multiple service locations 290 may be positioned at various locations within a large retail store or other space. The ASMs 240 at these locations 290 may be collectively managed by a single local or remote ASM administrator 240. In some cases, ASMs 240 within a single retail store may be managed by multiple administrators 240, some or all of which may be independent of the retail store management.

Each ASM 220 has a set of service characteristics that identify the services that the particular ASM 220 can provide. These may include physical/mechanical services and/or financial services such as reception of cash for deposit into an account. Each ASM 220 may also have an operation status that encompasses current availability of individual services or limitations on the services available.

In the system 200, each ASM 220 is co-located with a wireless beacon 270 at or within a specific service location 290. As used herein the term "beacon" refers to a wireless transmitter that constantly, periodically, or randomly broadcasts a signal regardless of the presence of a receiver within reception range of the transmitter. Beacons 270 used in conjunction with the invention will typically have an associated range volume throughout which the beacon's broadcast signal strength exceeds a level detectable by typical user devices. While typically, the beacons 270 used in the system 200 will be of the low energy beacon type such as may be found in retail store environments, wider area beacon types may also be used.

In typical embodiments, the signal of a beacon 270 may contain two numbers referred to herein as the beacon's major and minor identifiers. These identifiers may be used to identify the beacon's location. In particular applications, the beacon's major identifier may be associated with a relatively large area or building (e.g., a store or other business) in which multiple beacons may be positioned. In such applications, the minor identifier may be associated with a smaller area (e.g., a retail department) or with an exact display, kiosk, or ASM 220 that is within the larger area and with which the particular beacon is co-located. In some applications, the beacon's signal may also include a source identifier that identifies the controlling entity (e.g., a merchant or ASM administrator 240).

Accordingly, it can be seen that each beacon 270 has a unique identifier that may be associated with the service location 290 and its co-located ASM 220. The beacon 270 may be configured to broadcast its identifier continuously, periodically, or sporadically. Beacons 270 used in conjunction with the invention will typically have an associated range volume throughout which the beacon's broadcast signal strength exceeds a level detectable by typical user devices.

Figure 5:
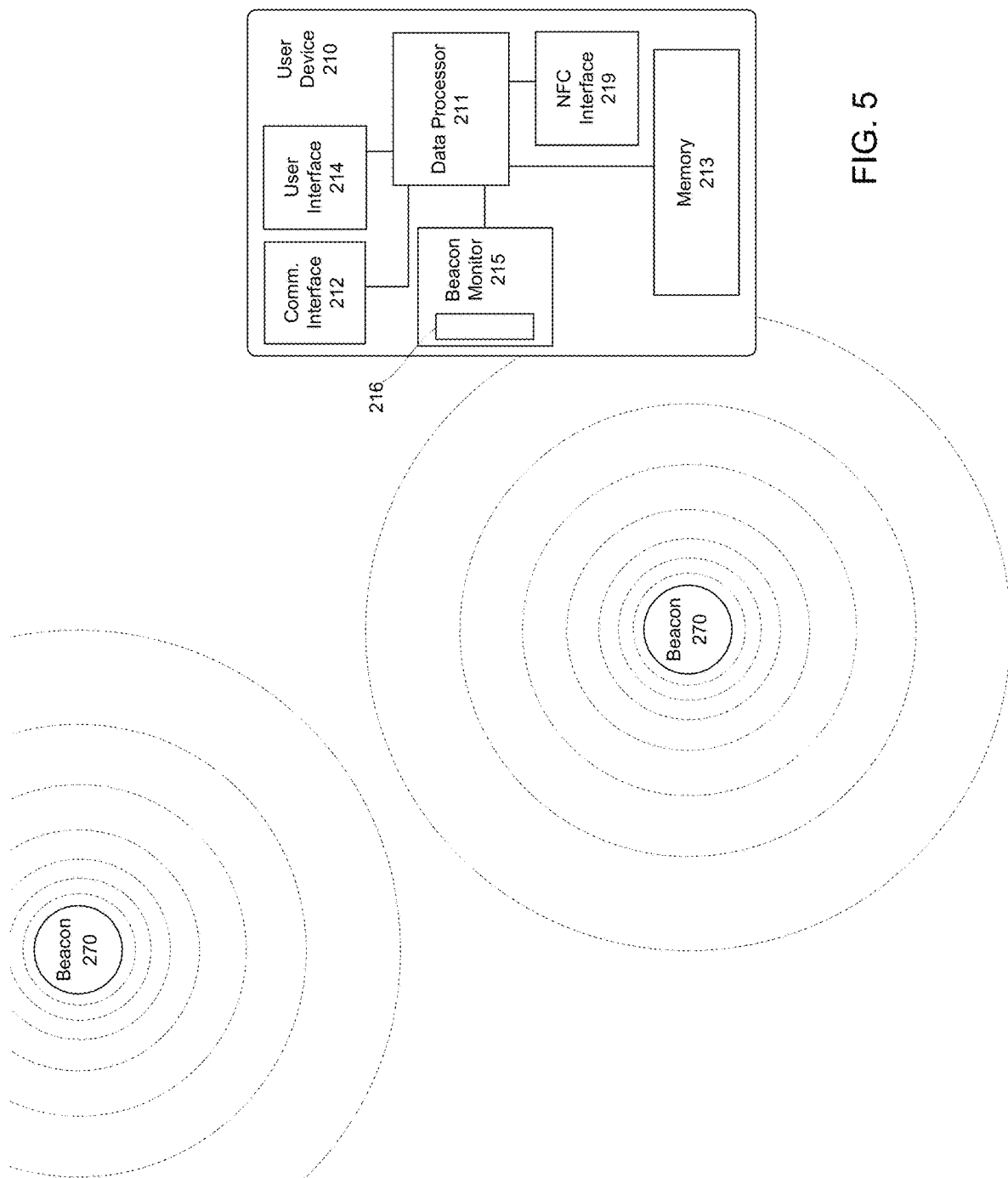
FIG. 5 is a schematic representation of a user device usable in conjunction with the system of FIG. 4 and with various embodiments of the invention.

With reference to FIG. 5, the user device 210 includes an on-board data processor 211 in communication with a memory module 213, a user interface 214, a communication interface 212, and an NFC interface 219, all of which may be substantially the same or similar to those described for the previously described user device 110. The user device 210, however, also includes a beacon monitor 215 in data communication with the data processor 211. The beacon monitor 215 is configured to receive and process transmissions from the beacons 270 via an antenna 216 or other beacon signal receiver, convert the signal to digital data, and forward the digital data to the data processor 211. The beacon monitor 215 may further be configured to determine the signal strength of a received transmission, which, in some cases, may allow the determination of a distance from the beacon 270.

The memory 213 may have stored therein a beacon monitoring application. The beacon monitoring application is operable as a background application comprising a plurality of instructions usable by the data processor 211 to receive and process signal data from the beacon monitor 215. The beacon monitoring application may be configured to determine from the signal data, location identity information for the beacon 270 broadcasting the signal from which the signal data is derived. Depending on the application, the location identity information may include one or both of the major and minor location identifiers of the broadcasting beacon 270. The beacon monitoring application may be further configured to use the location identity information to determine a location of the beacon 270. This may be accomplished by comparing the location identity information to known beacon information stored in the memory 213. Alternatively, the location identity information may be transmitted to a central processor, which determines and returns the location of the beacon to the user device 210.

In particular embodiments, the beacon monitoring application may be configured to receive instructions from the service location facilitation server 250 to change back and forth between an active state in which the beacon monitor 215 is activated and listening for beacon signals and an inactive state in which the beacon monitor 215 is not activated and beacon signals are not received. In alternative embodiments, the beacon monitor 215 may always be activated, but when the application is in the inactive state, received beacon signals are ignored. The beacon monitoring application may be further configured to receive an activation instruction from the service location facilitation server 250 to change from the inactive state to the active state and to receive a deactivation instruction to change form the active state to the inactive state.

The beacon monitoring application may be further configured so that, when in the active state, the application causes the user device 210 to transmit beacon identification information to the facilitation server 250 for beacon signals received by the beacon monitor 215. In some embodiments, beacon identification information is transmitted for all received beacon signals. In other embodiments, such information may be transmitted only if predetermined criteria are met. This could include, for example, a requirement that the signal is above a defined strength threshold. It could also include date or time range requirements. The beacon identification information may be or include the beacon identifier or, in some cases, the raw signal information.

The beacon monitoring application may also be configured to receive from the service location facilitation server a notification of the availability of a particular service. In response, the application may cause the data processor 211 to display service notification information to the user via the user interface 214. Service notification information may include identification and location of the automated service location 290 from which a beacon signal has been received. The service notification information may also include information about the services available at the location 290 and the anticipated need for one or more of these services. In some embodiments, the user may be asked to reply to the notification to indicate whether the user actually has the need for the service and/or whether the user will take advantage of the ASM 220 at the nearby service location 290. As in the previously described embodiment, the memory 213 may also have a service transaction application that is configured for communication with the ASM 220 upon arrival of the user at the location 290 and, for example, placement of the user device within NFC range of the ASM 220. The memory 213 has stored therein an NFC application comprising a plurality of instructions usable by the data processor 211 to establish communication with an NFC transmission device via the NFC interface 219. The service transaction application may also be configured for processing of some or all of a service transaction with the ASM 220.

The service location facilitation server 250 is a network-enabled processing system configured for communication via the network 230 with one or more account holder user devices 210. The server 250 includes a secure communication interface 252 in communication with the network 230 and configured to receive communications from the user devices 210 and, in some embodiments, some or all of the plurality of automated service machines 220 and/or one or more ASM administrator servers 240 and to provide an initial security screen to validate such communications. The server 250 further includes an authentication server 258, a service need processor 254, and a beacon evaluation processor 259.

The service need processor 254 is a network enabled computer processor configured for determining or estimating a service need for a particular account holder/user. In some cases, the user themselves can provide an indication of the need for a service. In others, the service need processor 254 may use a combination of user profile information, service usage history, statistical and current status information for the user and, in some cases, statistical information for a population group of other users to estimate a current need for a particular service. In some cases, the user may provide information on a behavior pattern upon registration for the service location service. For example, the user might indicate that they use a particular service at regular intervals or when certain specific criteria are met. In other cases, the service need processor 254 may use service usage records that allow the identification of a pattern of user behavior. In either case, the service need processor 254 may use the user's behavior pattern to establish criteria for the need for the particular service. The service need processor 254 can then monitor or periodically determine a service need state for the user that can be compared to this criteria. When the criteria are met, the service need processor 254 may transmit an instruction to the user's user device 210 to transition the beacon monitoring application from its inactive state to its active monitoring state. Once the service need has been fulfilled or if the service need criteria are no longer met, the service need processor 254 can transmit an instruction for the user device 210 to transition the beacon monitoring application back to the inactive state.

In a simple example, a user may have an established history that suggests they use an automated car wash approximately every two weeks during the summer months. The user may provide information on this behavior upon registration. Alternatively, the service need processor 254 may have access to car wash service usage records that allow the identification of a pattern of behavior. In either case, the service need processor 254 may use the behavior pattern to establish criteria for estimating the user's need for an automated car wash service. The criteria could simply be that two weeks have passed since the last car wash and the date is during the summer. The data for the current need state may be no more than the number of days since the previous car wash and the current date. Upon determining that the current day meets the service need criteria, the service need processor 254 transmits an instruction for the user device 210 to go to the active beacon monitoring state. It can also send a notification to the user suggesting the need for a car wash.

In a more complex example, the automated service involved could be reception of a cash deposit. In many instances, users may have a periodic or occasional need to relieve themselves of excess cash. This may be particularly true of users whose occupation (food server, bartender, etc.) causes them to receive some or all of their pay in cash. In other instances, the need to make a cash deposit may be driven by factors such as a low account balance. The service need processor 254 may use past deposit history (including locations, amounts, and associated financial status information), work and payday history, and other factors to determine need criteria for an automated cash deposit service. It could also periodically determine a service need state based on information such as a current work or pay schedule, current financial account information, and, in some embodiments, coarse geo-location information. If, upon comparison of the service need state to the service need criteria, the service need processor 254 determines that the need criteria have been met, the processor 254 transmits an instruction to the user device 210 to transition the beacon monitoring application from the inactive to the active state.

Accordingly, the service need processor 254 may be configured to receive service need information from multiple sources. This may include a user/account holder upon registering for the service location service or in a particular recurring service location monitoring request. It could also include an account servicing processor administering a financial or other account of the user/account holder and/or an ASM administrator server. The service need information may be any information that may be indicative of or can be used to estimate a relative need for a particular service. As noted above, this can be, for example, historical service usage data, current or historical account information, user or employer-provided schedule information, etc. The service need processor 254 may then estimate a service need state for the user/account holder using the service need information. The service need processor 254 may also be configured to establish service need criteria and for periodically comparing the current service need state to the service need criteria. If the service need state meets the service need criteria, the service need processor 254 transmits an instruction to the user device 210 to transition the beacon monitoring application from an inactive state to an active monitoring state. It may also be configured to transmit a need notification message for display to the user. The message may suggest the need for the service and note that the user will be further notified upon the user nearing an ASM service location 290 capable of providing the automated service.

In particular embodiments of the invention, the service need processor 254 may make use of machine learning methods to establish complex service need criteria. In such embodiments, historical service usage and state data for the user and, in some cases, other users may be used to build a machine learning model configured to provide a probabilistic estimate of a user's service need criteria. The service need processor 254 may be configured to enter need state information into the machine learning model to obtain an estimate for a relative level of need for the service. As will be discussed, the result of service need notifications and service location identification for the user can be used to update and modify the machine learning model.

In an exemplary embodiment, a machine learning model may be used to estimate a likely need for automated reception of cash for deposit. The service need state would include information on the current or likely cash holdings of the user/account holder and a desirable ASM 290 would be capable of receiving cash from the user and depositing it into a financial account. In this embodiment, the machine learning model would be configured to estimate the likely amount of cash held by the account holder. The estimate could be based on complex behavioral patterns of the user that account for schedule and location variations, changing preferences of the user, and geographic deposit history. The estimate could also be based on responses to previous notifications by the service location facilitation server 250 regarding a suggested need to deposit cash using a nearby ASM 270.

In exemplary embodiments, the service need processor 254 can use various neural networks, such as convolutional neural networks (CNNs) or recurrent neural networks (RNNs), to generate the machine learning model. A CNN may include one or more convolutional layers (e.g., often with a subsampling step) followed by one or more fully connected layers as in a standard multilayer neural network. An RNN is a class of artificial neural network where connections between nodes form a directed graph along a sequence. This facilitates the determination of temporal dynamic behavior for a time sequence.

The beacon evaluation processor 259 is a network enabled computer processor in communication with the network 230. The beacon evaluation processor 259 is configured to receive beacon notification messages from the user device 210 via the network 230. Each beacon notification message includes beacon identification information for a particular beacon from which the user device 210 has received a transmission. The beacon evaluation processor 259 can use this information to determine if the identified beacon is associated with an automated service location 290 that is an authorized participant in the location service provider's network. In some embodiments, this can be accomplished by comparing the beacon identifier to a list of authorized beacons stores in an ASM database 270. If the identifier matches that of a beacon associated with an authorized ASM 270 and location 290, the beacon evaluation processor 259 can use information from the ASM database 256 to determine whether the ASM 270 is capable of providing the desired service.

The ASM database 256 may include information on each ASM 270 in the participating network including the ASM's owning or managing entity, the type of service provided, and other characteristics and limitations of the ASM 270. In some embodiments, the beacon evaluation processor 259 may also be configured to transmit an information request to an ASM administrator 240 associated with the ASM 270. Information requested could include information on the general characteristics and limitations for the ASM 270 and/or current service status (e.g., current availability and any temporary limitations) for the ASM 270. For example, the information request could seek information on whether the ASM 270 is currently capable of receiving a deposit of a particular amount of cash. In some embodiments, the beacon evaluation processor 259 may obtain information on the current service need state from the service need processor 254 for use in determining whether the ASM 270 is capable of fulfilling the estimated service need.

If the beacon evaluation processor 259 determines that the service location 290 associated with a received beacon transmission is authorized and capable of providing the desired service, the processor 259 transmits a push notification to the user device 210 for display to the user. The push notification may include an indication that the user may have a need for the desired service and that the authorized service location 290 is nearby. The notification may also provide information about and/or directions to the service location 290.

The beacon evaluation processor 259 (or alternatively, the service need processor 254) may be further configured to receive a service notification from either or both of the ASM 290 and the ASM administrator 240 or, in some embodiments, the user device 210 indicating that an automated service was provided to the user by the ASM 290. The service notification may include information on the service transaction, including identification of the user and/or a user account, identification of the ASM 290 where the service transaction was completed and other information such as time and date and details of the service provided. For example, in a scenario where the service transaction is reception of a cash deposit, the service notification could include the amount of cash received and information on the account to which the cash amount is to be deposited.

In response to receiving the service notification, the beacon evaluation processor 259 may notify the service need processor 254, which can assess whether the service provided in the service transaction was sufficient to meet the service need (i.e., whether the service need state no longer meets the need criteria). If the service need no longer meets the service need criteria, the service need processor may transmit an instruction to the user device 210 to transition the beacon monitoring application from the active monitoring state to the inactive state.

Service transaction information from the service notification may be used by the beacon evaluation processor 259 (or, in some embodiments, the service need processor 254) to update the machine learning model used to establish the user's service need criteria. In doing so, the beacon evaluation processor 259 may include information from the push notification, including identification of the ASM 270 associated with the received beacon transmission. This allows the machine learning model to account for scenarios in which the user reacts to the need prompt, but does not use the recommended ASM 270. The beacon evaluation processor 259 may also be configured to set a time limit for acting on a push notification. Upon the absence of receiving a service notification within the time limit, the beacon evaluation processor 259 may cause the machine learning model to be updated using information from the push notification and an indication that no service transaction resulted within the time limit.

Figure 6:
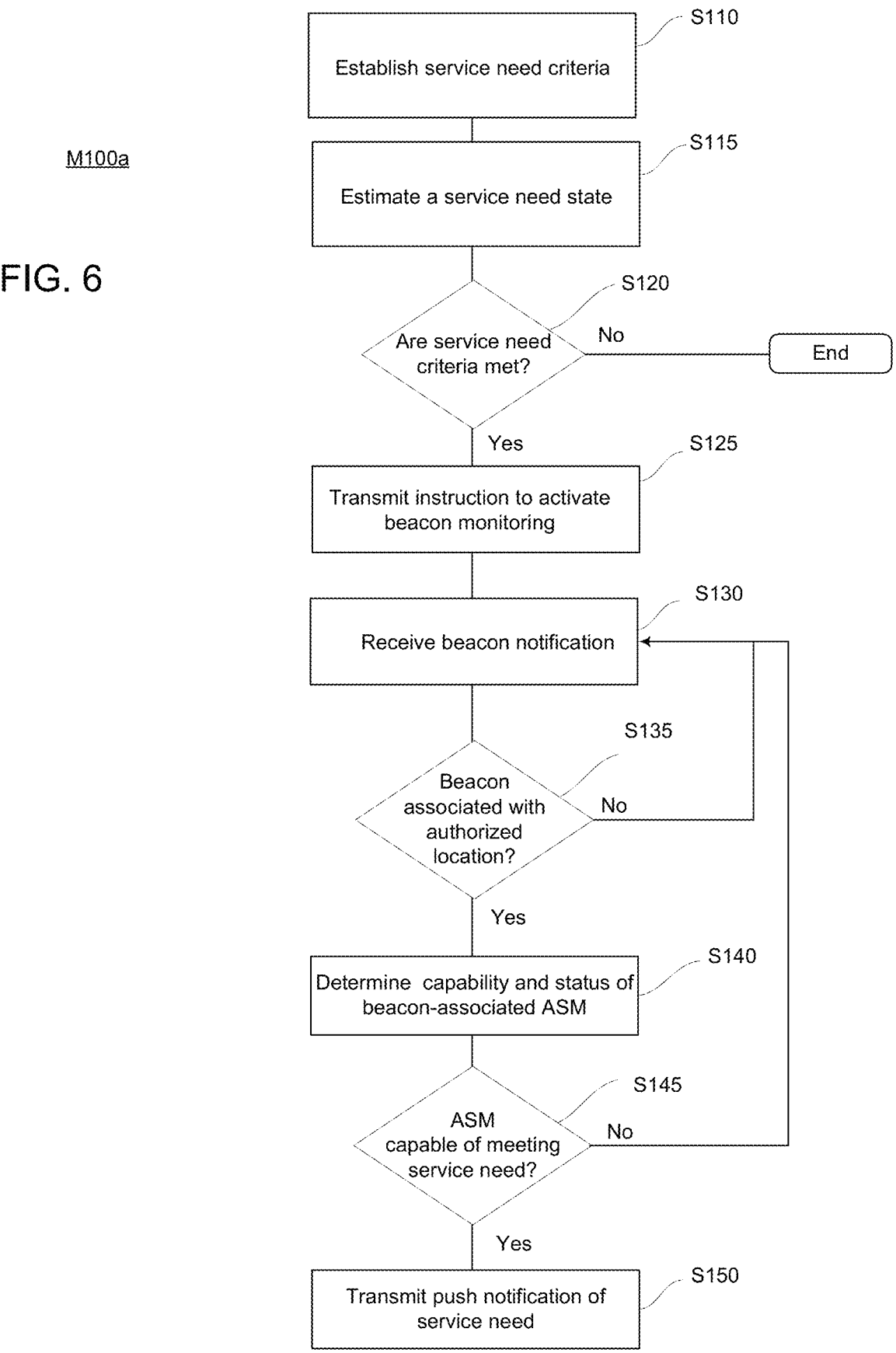
FIG. 6 is a block diagram of an automated method of enabling and implementing a beacon-based service location application in a user device according to an embodiment of the invention.
Figure 7:
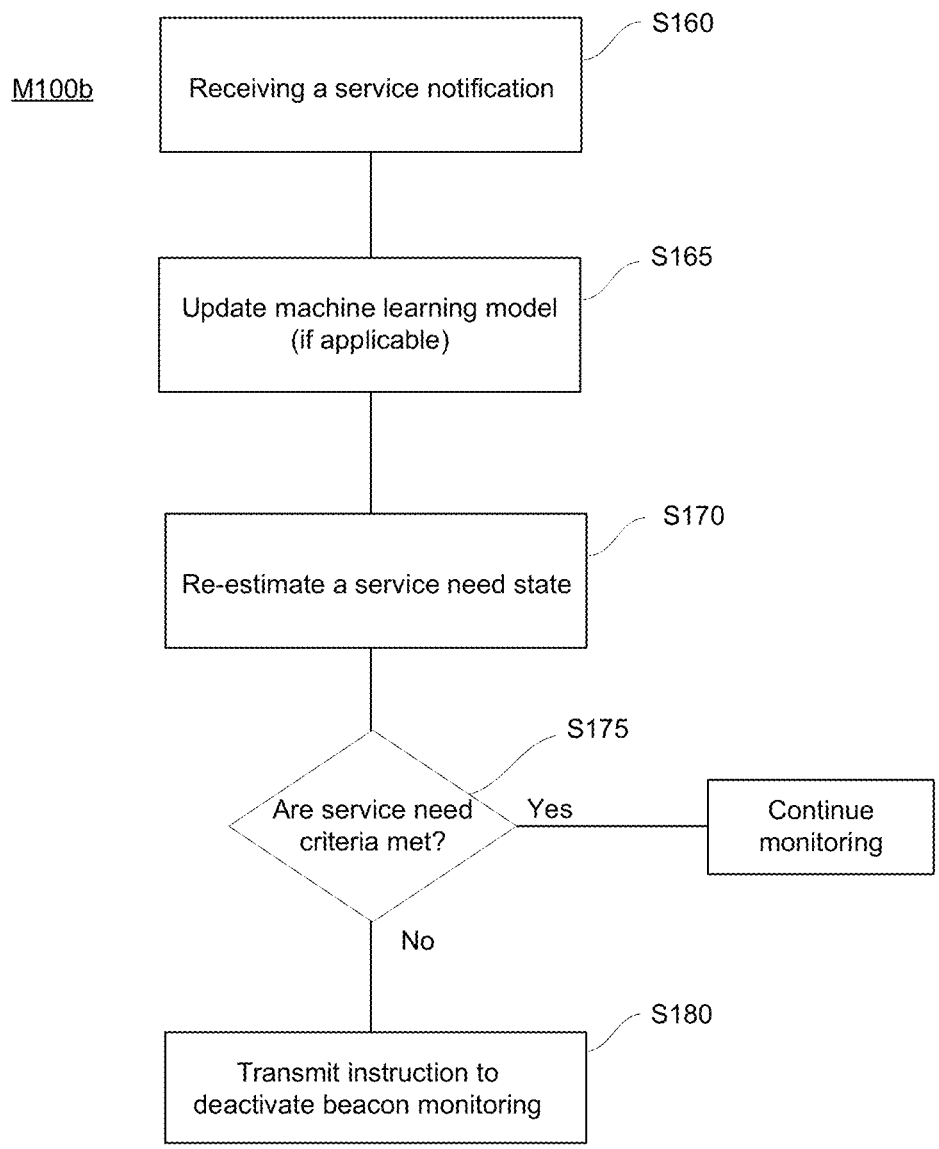
FIG. 7 is a block diagram of additional method actions for the method of FIG. 6 according to an embodiment of the invention.

The above-described system may be used to carry out methods according to various embodiments of the invention. FIGS. 6 and 7 illustrates the actions in an illustrative method M100 for activating a user device beacon monitoring application in response to identification, by a service location facilitation server (SLFS), of a likely need for an automated service. With reference to FIG. 6, at S110 of a method portion M100a, the service location facilitation server establishes service need criteria for a particular user/account holder associated with the user device. As used herein, "service need criteria" refers to the conditions under which the user will or would likely have a need for a particular automated service. Such conditions may be specified by the user upon registration for the service or at some point after registration and stored in a user database. In such embodiments, the action of establishing service need criteria would include accessing information from the user database. In other embodiments, service need criteria may be determined by the SLFS based on information provided by the user and/or historical service transaction information.

At S115 of the method M100a, the SLFS estimates a service need state for the user. As used herein, a service need state refers to information defining a set of current conditions or parameters for the user that can be compared to the service need criteria to determine a relative need for a service. In some cases, the service need state may be "estimated" with complete certainty based on parameter values supplied by the user or that can be determined with specificity from user account information. For example, a user's service need criteria for an automated cash deposit service may include (1) a checking account balance dropping below a minimum threshold, and (2) a known recurring cash pay day (e.g., every Friday). The service need state on any given day would include the user's checking account balance and the current day of the week. In another example, the user may simply inform the SLFS that they have a certain need state.

While the user's need state can sometimes be determined from specific known parameters, there are many instances where the service need state can only be estimated based on service usage history for the user and/or other users and on other factors that may increase or decrease the likelihood that the user would need a particular automated service. In such instances, the SLFS may obtain historical usage information and contemporaneous need state information to establish behavioral correlations for the user. In highly complex scenarios, the SLFS can use such information to generate a machine learning model that can provide an estimated user need state based on current conditions.

Once a service need state for the user has been estimated, it may be compared to the service need criteria at S120 to see if the need criteria are met. If they are not, the method ends for the current evaluation cycle. The actions S110, S115, and S120 may be subsequently repeated at regular or specified intervals to reevaluate the need for the service. If the criteria are met at S120, the SLFS transmits an instruction to the user device to transition the beacon monitoring application from an inactive state to an active monitoring state. This effectively places the user device in a beacon monitoring mode in which it will receive and pass on information from transmitting beacons within monitoring range of the user device.

When the user device receives a beacon signal, it transmits a beacon notification that includes beacon identification information over a network to the SLFS. At S125 of the method M100a, the SLFS receives the beacon notification, and at S135, the SLFS determines whether the beacon identified by the notification is associated with an authorized automated service location. As part of the action at S135, the SLFS may compare the beacon identification information to information from a database that lists beacon identifiers associated with authorized locations and ASMs. If the beacon is not associated with an authorized location, the SLFS may take no further action other than to wait for additional beacon notifications.

It will be understood that in some embodiments, if the beacon is associated with an authorized location, the SLFS may immediately proceed to the action of transmitting the push notification at S150. In preferred embodiments, however, if the beacon is associated with an authorized location or ASM, the SLFS determines ASM capability and/or status at S140. This may include querying an ASM database to obtain information on the characteristics of an ASM associated with the received beacon. Alternatively or in addition, it may include transmitting an ASM information request to and receiving information back from a server of an ASM administrator or other service provider. The received information may include characteristics of the service capabilities of the ASM. In some embodiments, the request may be or include a service status request and/or a current availability status for the ASM. In any event, the request would identification information for the beacon, the ASM, or the authorized service location.

At S145, the SLFS uses the ASM information obtained at S140 to determine whether the ASM at the service location associated with the transmitting beacon is capable of providing the needed service. This may include determining whether the ASM characteristics meets needed service criteria associated with the needed service.

If the service location/ASM does not meets the needed service criteria, the SLFS may take no further action other than to wait for additional beacon notifications. If the service location/ASM meets the needed service criteria, the SLFS transmits a push notification to the user device at S150. The push notification may include an indication that the user may have a need for the desired service and that the authorized service location and ASM are nearby. The notification may identify the service location and/or provide information about and/or directions to the service location.

In some embodiments, the method M100 may include additional actions based on the user's response to the push notification. With reference now to FIG. 7, at S160 of a second portion M100b of the method M100, the SLFS receives a service notification indicating that an automated service has been provided by an ASM. This service notification may be received from the ASM or an associated ASM administrator. In some embodiments, the service notification may be received from the user device. The service notification would identify the user device and/or user, the automated service provided and the providing ASM. It may also include service transaction information including time, date and other specific parameters that would vary depending on the service. For a cash deposit reception service, for example, the information may include the amount of the deposit and the account into which the deposit was made. In some embodiments, the SLFS may store the service transaction information in a usage database for the user.

It will be understood that the service transaction information may indicate that the user obtained the needed service from an ASM other than the one identified in the push notification. This information may be of particular value in establishing need criteria and/or estimating a service need state in the future.

In embodiments where the SLFS makes use of a machine learning model to estimate user need criteria and/or a usage need state, the SLFS may use the service transaction information to update the machine learning model at S165. The SLFS may also re-estimate the service need state at S170 to determine whether the service transaction has changed the need state sufficiently to meet the service need criteria. At S175, the SLFS compares the updated service need state to the service need criteria to see if the criteria are no longer being met. If the criteria are still being met by the updated service need state, the SLFS takes no action to deactivate the beacon monitoring application of the user device. This allows the user device to continue monitoring for beacons. The SLFS may also send a notification to the user device to notify the user that the service need remains. If, however, the service need criteria are no longer met at S175, the SLFS may transmit an instruction to the user device deactivate to deactivate the beacon monitoring application.

Figure 8:
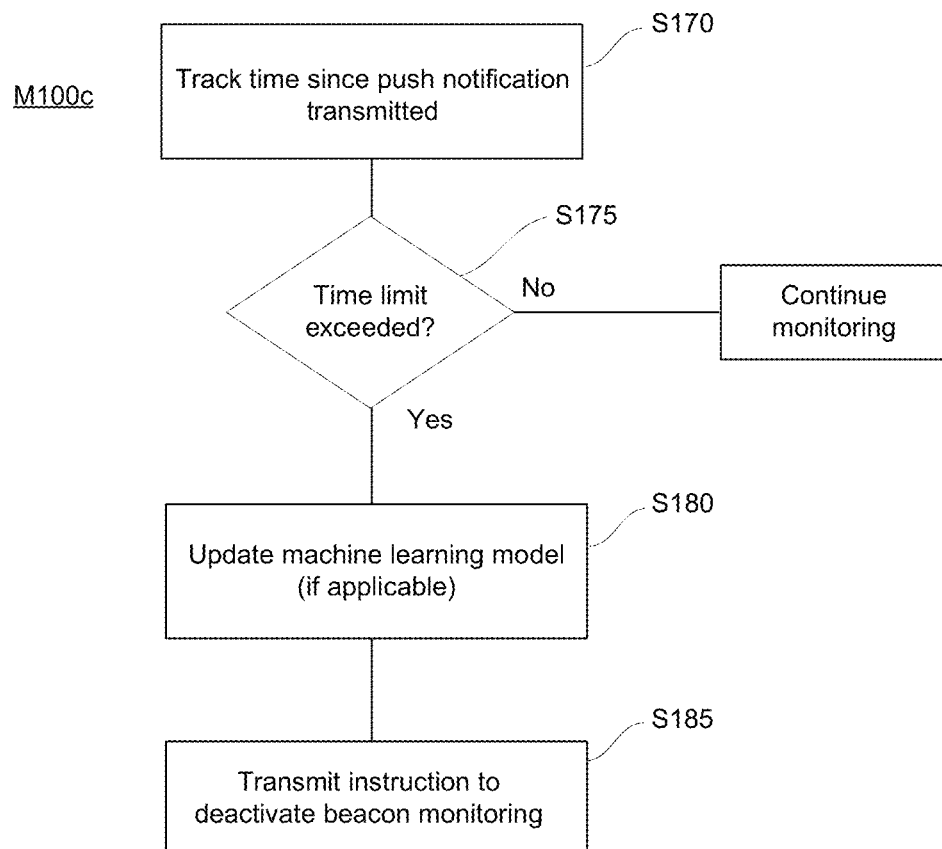
FIG. 8 is a block diagram of additional method actions for the method of FIG. 6 according to an embodiment of the invention.

In embodiments that make use of a machine learning model, important information for the model can be gained, not only from a service transaction resulting from a notification to the user, but from the lack of a service transaction after such a notification. Toward that end and with reference to FIG. 8, the method M100 may also include a portion M100c directed to providing "no-transaction" information to the machine learning model. In the method portion M100c, subsequent to the transmission of the push notification (action S150 of M100a), the SLFS, at S152, tracks the time elapsed since the push notification was transmitted. At S154, the SLFS determines whether the elapsed time exceeds a predetermined time limit without a needed automated service having been obtained. If not, the SLFS continues tracking. If, however, the time limit has been exceeded and no service has been obtained from an authorized ASM, the SLFS, at S156, updates the machine learning model with information indicating that the user failed to take action in response to the estimated service need identified in the push notification. At S158, the SLFS stops tracking the time from the push notification.

In some embodiments, the method M100 may include receiving, by the SLFS from the user device, a response to the push notification indicating that the user does not wish to make a cash deposit. Upon receiving this negative response, the SLFS may add no-transaction (i.e., no cash deposit service) to the historical data for the user, the no-cash transaction information including the service need state and an indication that no cash was deposited following the push notification. The SLFS may also update the machine learning model with information indicating that the user declined to take action in response. In these embodiments, the SLFS may also transmit an instruction to the user device to deactivate the beacon monitoring application.

In a particular scenario of interest, the service need of interest in method M100 may be automated receiving of cash for deposit into an account of the user. Typically, in such a scenario, the service need state would include information associated with the cash holdings of the user. This could be based, for example on information such as the date and time, a work schedule (e.g., for a restaurant food server) for the user, financial account information for the user, and past service transaction information. In some embodiments, the action of estimating the service need state requires estimating a likely amount of cash held by the user. In the example of a restaurant food server, the work schedule and other factors could be used to estimate the amount of cash in the worker's possession at the end of a work day. The action of determining whether the service need state meets the service need criteria could include comparing the likely amount of cash held to a cash deposit threshold included in the service need criteria. The cash deposit threshold could be based on the user's past cash deposit history.

As complexity increases, the advantage of employing a machine learning model increases. In the food server example, factors such as the day of the week and seasonal variations may be added to the model to account for probabilistic changes in cash level as a function of such factors. Even factors like weather variations could be added. Whenever a cash deposit notification is received from by the SLFS (e.g., from the user device, a service provider server or an ASM), cash transaction information from the notification (e.g., date, time, the cash amount deposited, etc.) may be added to the historical data for the user along with information on the current estimated service need state, and the machine learning model can be updated.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

What is claimed is:

1. An automated method of enabling and implementing a beacon-based service location application in a user device having a beacon monitoring application, the method comprising:
    establishing, by a service location facilitation server, service need criteria for a user of the user device;
    estimating, by the service location facilitation server, a service need state for the user, the service need state comprising information indicative of a relative need for a desired service;
    determining, by the service location facilitation server, whether the service need state meets the service need criteria;
    responsive to a determination that the service need state meets the service need criteria, transmitting, by the service location facilitation server, an instruction to the user device to transition the beacon monitoring application from an inactive state to an active monitoring state; and
    receiving, by the service location facilitation server from the user device, a beacon notification message including beacon identification information associated with a beacon transmission received by the user device from a transmitting beacon;
    determining, by the service location facilitation server, whether the transmitting beacon is associated with a service location that meets needed service criteria; and
    responsive only to a determination that the transmitting beacon is associated with a service location that meets the needed service criteria, transmitting a push notification to the user device, the push notification including identification of the desired service and the service location.

2. The automated method according to claim 1 wherein the action of determining whether the transmitting beacon is associated with a service location that meets needed service criteria comprises:
    determining whether the transmitting beacon is associated with an authorized service location.

3. The automated method according to claim 2 wherein the action of determining whether the transmitting beacon is associated with a service location that meets needed service criteria further comprises:
    transmitting, by the service location facilitation server to a service provider server associated with the authorized service location, a service status request including at least one of the set consisting of the beacon identification information and identification of the authorized service location,
    receiving a status request response including status information for the authorized service location, the status information including information on current services available at the authorized service location; and comparing the status information to at least a portion of the needed service criteria.

4. The automated method according to claim 1 wherein the action of estimating a service need state comprises:
    entering some or all of the information indicative of a relative need for a desired service into a machine learning model configured for calculating an estimate for a need level for the desired service,
        wherein the machine learning model is constructed using historical data for previous uses of the desired service by the user and contemporaneous service need states for the user.

5. The automated method according to claim 4 wherein the desired service is or includes automated receiving of cash for deposit into an account of the user and the service need state comprises information associated with cash holdings of the user.

6. The automated method according to claim 5 wherein:
the action of estimating a service need state comprises estimating a likely amount of cash held by the user, and
the action of determining whether the service need state meets the service need criteria comprises comparing the likely amount of cash held to a cash deposit threshold included in the service need criteria.

7. The automated method according to claim 6 further comprising:
receiving a cash deposit notification from at least one of the set consisting of the user device and a service provider server, the cash deposit notification including a cash amount deposited by the user;
adding cash transaction information to the historical data for the user, the cash transaction information including the cash amount deposited and the service need state; and
updating the machine learning model.

8. The automated method according to claim 6 further comprising:
responsive to one of the set consisting of receiving, by the service location facilitation server from the user device, a negative response to the push notification, and
expiration of a predetermined time interval after transmission of the push notification without receiving a cash deposit notification from the user device or a service provider server,
adding no-cash transaction information to the historical data for the user, the no-cash transaction information including the service need state and an indication that no cash was deposited following the push notification, and
updating the machine learning model.

9. The automated method according to claim 6 wherein the service need state includes information from the user including at least one of the set consisting of a current amount of cash held by the user and information on expected future influxes of cash.

10. An automated processing system for enabling and implementing a beacon-based service location application in a user device having a beacon monitoring application, the system comprising:
a service need processor having a first communication interface for communication via a network and configured to
receive service need information for an account holder from at least one of the set consisting of a user device of the account holder and an account servicing processor administering an account of the account holder, the service need information comprising information indicative of a relative need for a desired service,
establish service need criteria for the account holder, the service need criteria being usable to determine whether the account holder is likely to have a need for the desired service,
estimate a service need state for the account holder using the service need information,
determine whether the service need state meets the service need criteria, and
if the service need state meets the service need criteria, transmit an instruction to the user device to transition the beacon monitoring application from an inactive state to an active monitoring state; and
a beacon evaluation processor having a second communication interface for communication via the network and configured to
receive, from the user device via the network, a beacon notification message including beacon identification information associated with a beacon transmission received by the user device from a transmitting beacon,
determine whether the transmitting beacon is associated with an authorized service location,
if the transmitting beacon is associated with an authorized service location, determine whether the authorized service location is capable of providing the desired service, and
if the authorized service location is capable of providing the desired service, transmit a push notification to the user device via the network, the push notification including identification of the desired service and the authorized service location.

11. The automated processing system according to claim 10 wherein the beacon evaluation processor is further configured to, as part of the action to determine whether the authorized
service location is capable of providing the desired service:
transmit to a service provider server associated with the authorized service location, a service status request including at least one of the set consisting of the beacon identification information and identification of the authorized service location,
receive from the service provider server a status request response including status information for the authorized service location, the status information including information on current services available at the authorized service location, and
compare the status information to the service need state.

12. The automated processing system according to claim 10 wherein the service need processor is further configured to, as part of the action to estimate a service need state for the account holder using the service need information:
enter service information into a machine learning model configured for calculating an estimate for a need level for the desired service,
wherein the machine learning model is constructed using historical data for previous uses of the desired service by the account holder and contemporaneous service need states for the account holder.

13. The automated processing system according to claim 12 wherein:
the desired service is automated receiving of cash for deposit into the account of the account holder,
the service need state comprises information associated with cash holdings of the account holder, and
the authorized service location includes an automated system configured for receiving cash from the account holder and for transacting a deposit into an account of the account holder.

14. The automated processing system according to claim 13 wherein:
the machine learning model is configured to estimate a likely amount of cash held by the account holder, and
wherein the beacon evaluation processor is further configured to, as part of the action to estimate a service need state, compare the likely amount of cash held to a cash deposit threshold included in the service need criteria.

15. The automated processing system according to claim 12 wherein the service need processor is further configured to:
receive a cash deposit notification from at least one of the set consisting of the user device and a service provider server, the cash deposit notification including a cash amount deposited by the account holder;
add cash transaction information to the historical data for the account holder, the cash transaction information including the cash amount deposited and the service need state; and update the machine learning model.

16. A beacon-based system for alerting a user to availability of a desired service, the system comprising:
a plurality of service locations each having an automated service system configured for providing a user service, the automated service system being in communication with a service provider server via a network, and
a beacon configured for transmitting a beacon signal comprising a unique beacon identifier associated with the authorized service location;
a user device comprising
a data processor,
a user device communication interface configured for selective communication with the network,
a beacon signal receiver,
a memory accessible by the data processor, the memory having stored thereon a beacon monitoring application having an active monitoring state and an inactive state and is configured for, when in the active monitoring state, instructing the data processor to receive beacon signals from the beacons via the beacon signal receiver, and for each signal, determine the unique beacon identifier for each signal and transmit, via the network, a beacon notification message comprising the unique beacon identifier; and
a service location facilitation server comprising
a service need processor having a first communication interface for communication via the network and configured to
estimate a service need state for a user of the user device, the service need state comprising information indicative of a relative need for a desired service,
determine whether the service need state meets service need criteria, and responsive to a determination that the service need state meets service need criteria, transmit an instruction to the user device to transition the beacon monitoring application from the inactive state to the active monitoring state, and
a beacon evaluation processor having a second communication interface for communication via the network and configured to
receive, from the user device via the network, the beacon notification message,
determine whether the beacon identified by the unique beacon identifier in the beacon notification message is associated with an authorized service location that meets needed service criteria, and
responsive only to a determination that the beacon identified by the unique beacon identifier is associated with an authorized service location that meets the needed service criteria, transmitting a push notification to the user device, the push notification including identification of the desired service and the authorized service location.

17. The beacon-based system according to claim 16 wherein the service need processor is further configured to, as part of the action to estimate a service need state:
enter the information indicative of a relative need for a desired service into a machine learning model configured for calculating an estimate for a need level for the desired service,
wherein the machine learning model is constructed using historical data for previous uses of the desired service by the user and contemporaneous service need states for the user.

18. The beacon-based system according to claim 17 wherein:
the desired service is automated receiving of cash for deposit into a financial account of the user,
the service need state comprises information associated with the cash holdings of the user, and
the automated service system of the authorized service location is configured for receiving cash from the user and for transacting a deposit into the financial account of the user.

19. The beacon-based system according to claim 18 wherein the service need processor is further configured to:
receive a cash deposit notification from at least one of the set consisting of the user device and the service provider server, the cash deposit notification including a cash amount deposited by the user,
add cash transaction information to the historical data for the user, the cash transaction information including the cash amount deposited and the service need state, and update the machine learning model.

\* \* \* \* \*